United States Patent [19]

Boddy

[11] Patent Number: 5,684,646
[45] Date of Patent: Nov. 4, 1997

[54] EXTERIOR MIRROR WITH SINGLE PIVOT POWER FOLD

[75] Inventor: Ian Boddy, Ada, Mich.

[73] Assignee: Lowell Engineering Corporation, Alto, Mich.

[21] Appl. No.: 373,742

[22] Filed: Jan. 17, 1995

[51] Int. Cl.[6] .............................. G02B 5/08; G02B 7/182; B60R 1/06
[52] U.S. Cl. ........................ 359/841; 359/872; 359/877; 248/479; 248/483; 248/900; 248/549
[58] Field of Search ........................... 359/841, 872, 359/877; 248/549, 479, 483, 900

[56] References Cited

U.S. PATENT DOCUMENTS

| | | | |
|---|---|---|---|
| 2,871,761 | 2/1959 | Snyder | 359/841 |
| 3,830,561 | 8/1974 | LaFave et al. | 359/877 |
| 4,363,534 | 12/1982 | Covert | 359/877 |
| 4,626,083 | 12/1986 | Nakayama et al. | |
| 4,626,084 | 12/1986 | Kumai | 359/841 |
| 4,657,362 | 4/1987 | Suzuki | |
| 4,692,000 | 9/1987 | Wada et al. | 359/877 |
| 4,786,157 | 11/1988 | Mori et al. | 359/877 |
| 4,832,477 | 5/1989 | Torii et al. | 359/877 |
| 4,893,916 | 1/1990 | Sakuma et al. | 359/877 |
| 4,915,493 | 4/1990 | Fisher et al. | |
| 4,919,526 | 4/1990 | Umekawa et al. | 359/841 |
| 4,981,349 | 1/1991 | Tamiya | 359/877 |
| 4,982,926 | 1/1991 | Mori et al. | |
| 5,012,693 | 5/1991 | Enomoto et al. | |
| 5,111,341 | 5/1992 | Keast | 359/841 |
| 5,172,884 | 12/1992 | Ishiyama | |
| 5,190,499 | 3/1993 | Mori et al. | |
| 5,305,144 | 4/1994 | Mori et al. | |
| 5,369,530 | 11/1994 | Yamauchi et al. | 359/877 |
| 5,432,641 | 7/1995 | Mochizuki | 359/841 |

FOREIGN PATENT DOCUMENTS

| | | | |
|---|---|---|---|
| 0148736 | 8/1985 | Japan | 359/877 |
| 0148737 | 8/1985 | Japan | 359/877 |
| 9104172 | 4/1991 | WIPO | 359/877 |

Primary Examiner—Ricky D. Shafer
Attorney, Agent, or Firm—Cushman Darby & Cushman IP Group of Pillsbury Madison & Sutro LLP

[57] ABSTRACT

A vehicle mirror assembly comprises a housing assembly and a mirror unit mounted on the housing assembly. A support assembly is provided which is constructed and arranged to be fixedly mounted on a vehicle and to support the housing assembly thereon in an operative position extending laterally outwardly from the vehicle so that the mirror unit serves as an exterior rear view mirror for the driver of the vehicle. A power operated pivot assembly is provided between the support assembly and the housing assembly constructed and arranged to enable the housing assembly to be pivoted with respect to the support assembly about a generally upright axis (1) between the operative position thereof and a folded position with respect to the vehicle in response to the power operation of the pivot assembly and (2) from the operative position thereof in either direction in response to an unwanted impact blow applied in either direction thereto. The power operated pivot assembly includes at least one tubular member carried by one of the assemblies in concentric relation to the upright axis and an electric motor constructed and arranged within the tubular member to be operated by electrical power in a manner to generate flux for which the tubular member constitutes a flux yoke.

20 Claims, 2 Drawing Sheets

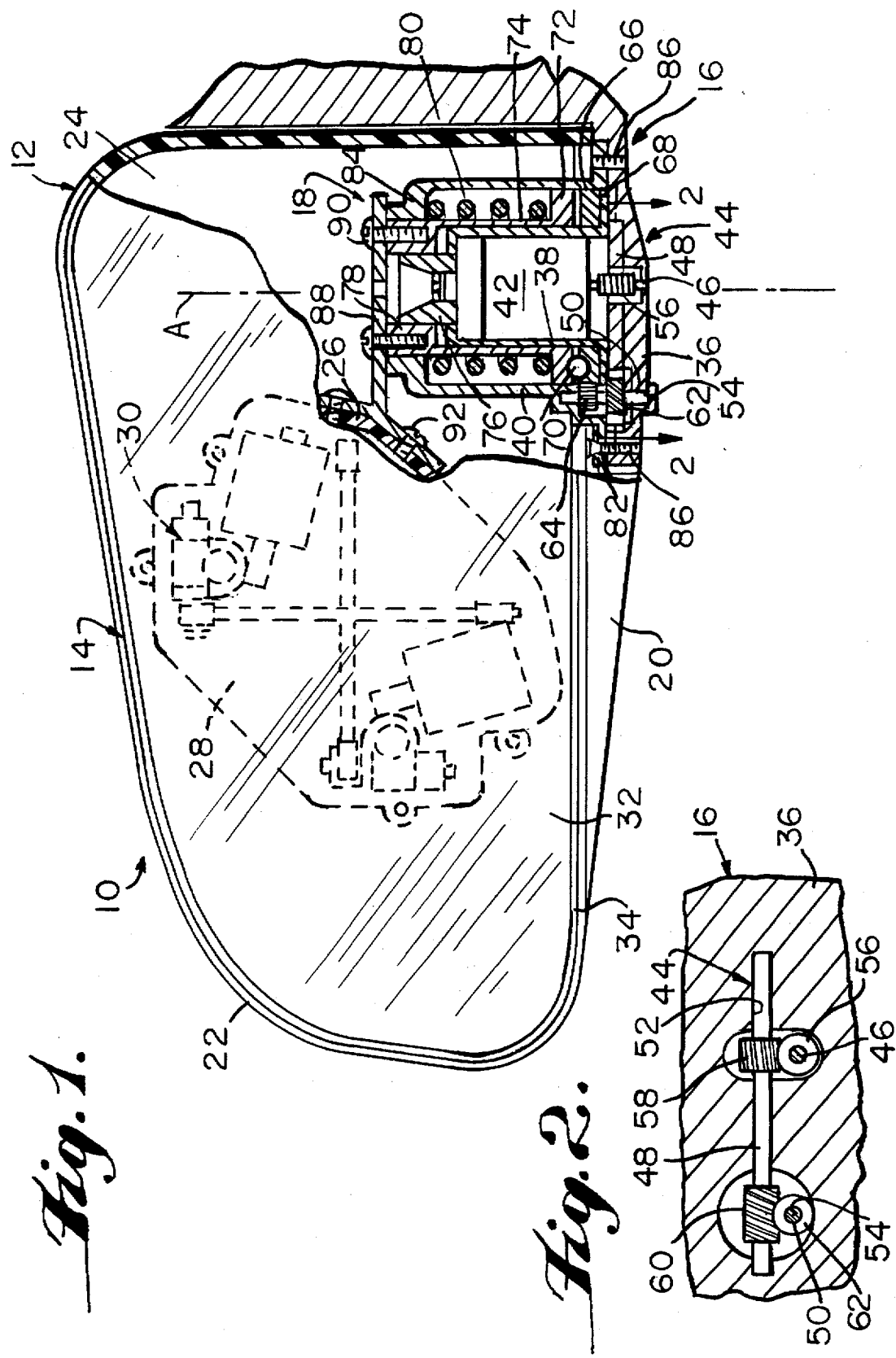

EXTERIOR MIRROR WITH SINGLE PIVOT POWER FOLD

This invention relates to vehicle mirror assemblies and more particularly to vehicle mirror assemblies commonly attached to vehicle doors to provide for exterior rear view vision.

It has long been desirable for exterior door mounted vehicle mirror assemblies to have the capability of being moved from a normal operating position into a folded position either under power operation, manual operation or in response to unwanted impact blows which are applied thereto. Many mirrors having this capability are of the single pivot type. Single pivot mirror assemblies include a support assembly, which is fixed to the vehicle specifically the vehicle door, a mirror housing assembly, which usually carries an adjustable mirror unit and a power operated pivot assembly which enables the housing assembly to be pivoted with respect to the support assembly about a generally upright axis (1) between the operative position thereof and a folded position with respect to the vehicle in response to the power operation of the pivot assembly and (2) from the operative position thereof in either direction in response to an unwanted impact blow applied in either direction thereto. Examples of mirror assemblies of this type are found in the following U.S. Pat. Nos. 4,626,083, 4,657,362, 4,982,926, 5,012,693, 5,172,884, 5,190,499, and 5,305,144.

A common characteristic of all of these prior art mirror assemblies is that the electrical motor of the power operated pivot assembly is carried by the movable housing assembly in offset relationship with respect to the upright axis of pivotal movement provided by the pivot assembly. Applicant has found that there are several advantages which can be accrued by mounting the electric motor within the tubular members which form the pivot. One advantage which is accrued is that, by so mounting the electric motor within the tubular members which provide the pivot, the tubular members can become a flux yoke for the flux generated in the electric motor, thus enhancing the efficiency of the motor itself and, hence, the performance of the entire mirror assembly.

Accordingly, it is an object of the present invention to provide a vehicle mirror assembly which achieves the advantage noted above. In accordance with the principles of the present invention, this objective is secured by providing a vehicle mirror assembly which comprises a housing assembly, a mirror unit mounted on the housing assembly, and a support assembly constructed and arranged to be fixedly mounted on a vehicle and to support the housing assembly thereon in an operative position extending laterally outwardly from the vehicle so that the mirror unit serves as an exterior rear view mirror for the driver of the vehicle. A power operated pivot assembly between the support assembly and the housing assembly is constructed and arranged to enable the housing assembly to be pivoted with respect to the support assembly about a generally upright axis (1) between the operative position thereof and a folded position with respect to the vehicle in response to the power operation of the pivot assembly and (2) from the operative position thereof in either direction in response to an unwanted impact blow applied in either direction thereto. The power operated pivot assembly includes at least one tubular member carried by one of the assemblies in concentric relation to the upright axis and an electric motor is constructed and arranged within the tubular member to be operated by electrical power in a manner to generate flux for which the tubular member constitutes a flux yoke.

Another advantage which can be accrued by mounting the electric motor within the pivot is that the components of the pivot assembly can be centralized and the assembly thereof made much easier.

Accordingly, it is a further object of the further invention to provide a vehicle mirror assembly which achieves the advantages noted above. In accordance with the principles of the present invention, this objective is secured by providing a vehicle mirror assembly which comprises a housing assembly, a mirror unit mounted on the housing assembly, and a support assembly constructed and arranged to be fixedly mounted on a vehicle and to support the housing assembly thereon in an operative position extending laterally outwardly from the vehicle so that the mirror unit serves as an exterior rear view mirror for the driver of the vehicle. A power operated pivot assembly is provided between the support assembly and the housing assembly constructed and arranged to enable the housing assembly to be pivoted with respect to the support assembly about a generally upright axis (1) between the operative position thereof and a folded position with respect to the vehicle in response to the power operation of the pivot assembly and (2) from the operative position thereof in either direction in response to an unwanted impact blow applied in either direction thereto. The power operated pivot assembly includes a series of components constructed and arranged to be assembled with respect to the support assembly in a predetermined sequence of downward movements into a predetermined cooperating relation with one another. The series of components includes an outer tubular member which is moved with respect to the support assembly as the last downward movement in the sequence and fixed thereto to retain the remaining components of the series in the predetermined cooperating relation with one another and a tubular body disposed within the outer tubular member extending upwardly from an opening in an upper end of the outer tubular member for connection with the housing assembly. The housing assembly is connected with the tubular body by a connection constructed and arranged to enable the housing assembly to be moved about the upright axis by the tubular body in response to the power operation of the pivot assembly.

Another advantage which is accrued as a result of positioning the motor as indicated is that it can be made to conveniently be carried by the support assembly rather than the housing assembly and this arrangement has also been found to be a desirable advantage from the standpoint of cost effectiveness and efficient use of space.

Accordingly, it is still another object of the present invention to provide a vehicle mirror assembly which achieves the advantages noted above. In accordance with the principles of the present invention, this objective is achieved by providing a vehicle mirror assembly which comprises a housing assembly, a mirror unit mounted on the housing assembly for movement into any one of a multiplicity of adjusted positions with respect thereto. A support assembly is provided constructed and arranged to be fixedly mounted on a vehicle and to support the housing assembly thereon in an operative position extending laterally outwardly from the vehicle in forwardly covering and generally surrounding relation to the mirror unit which serves as an exterior rear view mirror for the driver of the vehicle. A power operated pivot assembly is provided between the support assembly and the housing assembly constructed and arranged to enable the housing assembly to be pivoted with respect to the support assembly about a generally upright axis (1) between the operative position thereof and a folded position with respect to the vehicle in response to the power operation of the pivot assembly and (2) from the operative position thereof in either direction in response to an unwanted impact blow applied in either direction thereto. The power operated pivot assembly includes an electrical motor constructed and arranged to be operated by electrical power, and a speed reduction motion transmitting assembly connected between an output shaft of the electric motor and the housing assembly. The electric motor is fixedly mounted on the support assembly. The motion transmitting assembly comprises components mounted on the support assembly including a first motion transmitting member connected to move in response to a desired rotational movement of the motor shaft, a second motion transmitting member connected to move with the housing assembly, and a spring biased indexing system between the first and second motion transmitting members constructed and arranged to (1) transmit the movement of the first motion transmitting member in response to a desired rotation of the motor shaft to the second motion transmitting member to thereby move the housing assembly in response to the desired rotation of the motor shaft and (2) allow the second motion transmitting member to move with the housing assembly relative to the first motion transmitting member in response to an unwanted impact blow applied in either direction to the housing assembly.

These and other objects of the present invention will become more apparent during the course of the following detailed description and appended claims.

The invention may best be understood with reference to the accompanying drawings wherein an illustrative embodiment is shown.

IN THE DRAWINGS

FIG. 1 is an elevational view of a vehicle mirror assembly embodying the principles of the present invention as viewed by looking forwardly at the lefthand side of the vehicle with the mirror assembly in its operative position, the mirror assembly being shown partly in section for purposes of clearer illustration;

FIG. 2 is an enlarged fragmentary sectional view taken along the line 2-2 of FIG. 1;

Figure 3:
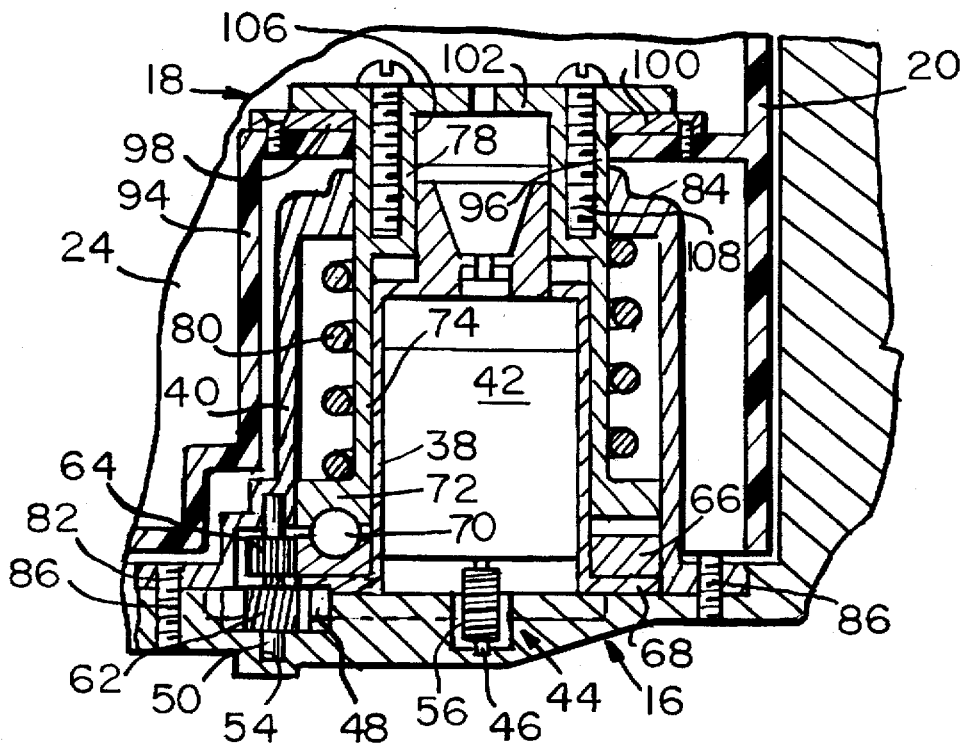
FIG. 3 is an enlarged cross-sectional view of the material shown in FIG. 1 in cross-section showing a modified form of the mirror assembly in its normal operative position.

Referring now more particularly to the drawings, there is shown in FIG. 1 thereof, a vehicle mirror assembly, generally indicated at 10, which embodies the principles of the present invention. The vehicle mirror assembly 10 includes, in general, a housing assembly, generally indicated at 12, a mirror unit, generally indicated at 14, mounted on the housing assembly 12, a support assembly, generally indicated at 16, constructed and arranged to be fixedly mounted on a vehicle, and specifically a front door thereof, so that the mirror unit 14 serves as a rear view mirror for the driver of the vehicle, and a power operated pivot assembly, generally indicated at 18, between the support assembly 16 and the housing assembly 12 constructed and arranged to enable the housing assembly to be pivoted with respect to the support assembly about an upright axis "A" (1) between the operative position thereof and a folded position with respect to the vehicle in response to the power operation of the power operated pivot assembly 18 and (2) from the operative position thereof in either direction in response to an unwanted impact b low applied in either direction thereto. The power operated pivot assembly 18 also permits the housing assembly 12 to move from the operative position thereof in either direction in response to a manual force applied in either direction to the housing assembly 12.

The construction of the housing assembly 12 is dependent upon whether the mirror assembly 10 is to be attached to a passenger car type automotive vehicle or other type of automotive vehicle, such as a truck or the like. In the passenger car exemplary embodiment shown, the housing assembly 12 includes a molded plastic shell structure 20 providing a rearwardly disposed periphery 22 extending in surrounding relation to the mirror unit 14 and a front wall 21 which bulges forwardly in covering relation to the mirror unit 14.

The housing assembly 12, as shown, also includes a fixed casing member 26 which is fixed to the central portion of the front housing wall 24 or it may be molded as an integral part thereof. The fixed casing member 26 is constructed and arranged to mate with a cooperating casing member 28 which is detachably fixed thereto. Carried by and within the casing members 26 and 28 is a power operated adjusting mechanism, generally indicated at 30, which extends from the casing member 28 to the mirror unit 14. The adjusting mechanism 30 is constructed and arranged to move the mirror unit 14 in to any one of a multiplicity of adjusted positions with respect to the housing assembly 14. As shown, the adjusting mechanism 30 is constructed in accordance with the principles enunciated in commonly assigned copending U.S. application Ser. No. 08/106,883, the disclosure of which is hereby incorporated by reference into the present specification. It will be understood that other known power operated mechanisms may be utilized, as, for example, the more conventional mechanism as disclosed in U.S. Pat. No. 4,915,493, the disclosure of which is hereby incorporated by reference into the present specification.

In the embodiment shown, the mirror unit 14 consists of a mirror 32 and a mirror holder 34 the forward portion of which includes mounting elements for the adjusting mechanism 30. The adjusting mechanism 30 need not be power operated but may be manually operated. In its broadest aspects, the present invention contemplates the utilization of a mirror unit 10 which is fixedly carried by the housing assembly 12 as in truck usage with the power operation of the pivot assembly 18 being used to adjust it.

In the preferred embodiment shown, the support assembly 16 includes a rigid structure 36 which is fixed to the vehicle front door. If desired, the rigid structure 36 can be covered by a cover member (not shown) in accordance with the teachings of commonly assigned copending U.S. patent application Ser. No. 08/106,756, now U.S. Pat. No. 5,477, 391, the disclosure of which is hereby incorporated by reference into the present specification.

The power operated pivot assembly 18 is constructed in accordance with the principles of the present invention. The pivot assembly 18 is preferably made up of a series of components constructed and arranged to be assembled with respect to the fixed support structure 36 in a predetermined sequence of downward movements into a predetermined cooperating relation to one another. The components include an inner tubular member 38 and outer tubular member 40 which are fixed to the fixed support structure 36 concentric with the upright pivotal axis provided by the pivot assembly 18, an electric motor 42 disposed within the inner tubular member 38 and a speed reducing motion transmitting assembly, generally indicated at 44, between an output shaft 46 of the electric motor 42 and the housing assembly 12.

As best shown in FIG. 2, the motion transmission assembly 44 includes an elongated shaft 48 and a stub shaft 50 which are the first components to be assembled by downward movements into an upwardly opening bearing groove 52 and an upwardly opening bore 54 respectively formed in the fixed support structure 36. As shown, bore 54 is formed parallel with the pivotal axis to receive the lower end portion of the stub shaft 50 and the bearing groove 52 is formed in the fixed support structure 36 so that the elongated shaft 48 is journalled therein for rotation about an axis parallel to a plane passing through the axis of the stub shaft 50 and the pivotal axis provided by the pivot assembly 18.

The motion transmitting assembly 44 also includes a drive gear 56, which may be either a worm gear or a spiral gear, fixed on the motor output shaft 46 and a driven gear 58 on the elongated shaft 48 disposed in meshing relation with the drive gear 56. Fixed on the elongated shaft 48 is a secondary drive gear 60, which also may be either a worm gear or a spiral gear. A secondary driven gear 62 is fixed on the stub shaft 50 in meshing relation with the secondary drive gear 60. Fixed to the stub shaft 50 above the gear 62 is a spur gear 64 which meshes with an exterior ring gear 66. Ring gear 66 rests on an exterior annular flange 68 formed on the lower end of the inner tubular member 38.

It will be understood that the bearing groove 52 for the elongated shaft 48 is enlarged int the area of the cooperating gears 56 and 58 and cooperating gears 60 and 62 and that the elongated shaft 48 and stub shaft 50 can be moved downwardly together during assembly or one after the other. In the preferred embodiment shown, the electric motor 42 is fixedly mounted within the inner tubular member 38 which is the next component to be assembled by moving the lower exterior flange 66 into engagement with the fixed support structure 36.

If desired, in order to positively prevent movement of the inner tubular member 38 about its axis which is concentric to the pivotal axis, the flange 66 may be suitably pinned to the fixed support structure 36 or otherwise prevented from turning about its axis. It will be understood that the inner tubular member 38 with the electric motor 42 fixed thereto must be assembled in such a way as to bring the drive gear 56 into meshing relation with the driven gear 58. Moreover, since the motor 42 is fixed on the fixed support structure 36, suitable grooves (not shown) can be formed in the fixed support structure 36 to accommodate the electrical control wires (not shown) for the motor 42. Motor 42 does not fill the entire space within the inner tubular member 38 permitting other wires (not shown) for operating the motors of the power operating adjusting mechanism 30 to be fed from the fixed support structure 36 through the pivot assembly 18 by passing the motor 42 within the inner tubular member 38.

The ring gear 66 is assembled next by being moved downwardly over the inner tubular member 38 to mesh with spur gear 64 until it rests on flange 68. The exterior portion of the inner tubular member 38 above the flange 68 forms a bearing for the ring gear 66. The ring gear 66 forms one part of a clutch or indexing system which is incorporated within the motion transmission assembly 44. As shown, the clutch or indexing system is of the spring pressed ball type including three equally annularly spaced balls 70 disposed in hemispherical ball receiving recesses formed in the upper surface of the ring gear 66. The upper portion of the balls 70 are arranged to be disposed in three shallower arcuately concave recesses extending upwardly from the lower surface of an exterior annular flange 72 formed on the lower end of a tubular body 74. The tubular body 74 is the next component of the motion transmitting assembly 44 to be assembled after the balls 70 have been lowered into the hemispherical recesses of the ring gear 66.

It will be noted that the tubular body 74 can be moved downwardly over the inner tubular member 38 until the lower flange 72 thereof rests on the balls 70 and thereafter can be turned to insure that the upper portion of the balls 70 enter into the shallow recesses in the flange 72. It will also be noted that the inner tubular member 38 includes an upstanding cylindrical portion 76 of reduced diameter at its upper end which serves as a bearing for the upper end of the tubular body 74 which includes an inwardly extending cylindrical portion 78 slidably engaging the bearing portion 76.

Mounted over the tubular body 74 is a helical coil spring 80 which forms a part of the indexing system. The coil spring is assembled by merely lowering it over the tubular body 74 until its lower end engages the annular flange 72. The assembly of the components of the pivot assembly 18 is completed by lowering the outer tubular member 40 in spaced relation over the coil spring 80. The outer tubular member 40 has its lower end provided with a flanged construction 82 which accommodates spur gear 64 and rotatably receives the upper end of the stub shaft 50. The upper end of the outer tubular member 40 is formed with an interior annular flange 84 which provides an interior bearing for the upper end of the tubular body 74.

When the outer tubular member 40 is moved downwardly into its assembled position, the flanged lower end 82 engages the fixed support structure 36 and the upper interior flange 84 compresses coil spring 80 to resiliently urge the tubular body 74 downwardly capturing the balls 70 within the recesses. In this assembled position, the outer tubular member 40 is fixed to the fixed support structure 36 as by fasteners 86 to thereby retain all of the components in their predetermined cooperative relation as shown.

In the preferred embodiment shown in FIG. 1, the assembly of the entire mirror assembly 10 is completed by mounting the housing assembly 12 with the mirror unit 14 therein on the pivot assembly 18. The connection is made in the embodiment shown in FIG. 1 by fixing a bracket 88 to the upper end 78 of the tubular body 74, as by fasteners 90. As shown, bracket 88 is, in turn, fixed to the casing member 26, by fasteners 92 or the like.

With the mirror assembly 10 assembled in the manner indicated above and suitably mounted on the vehicle, a control extended to the driver's compartment in the vehicle can be actuated to energize the electric motor 42. Preferably, the motor 42 is a reversible motor and the controls include switches or buttons for operating the electric motor in either direction. In one direction of rotation of the motor, the drive gear will impart a rotational movement to the elongated shaft through meshing gear 58 and the secondary drive gear 60 on the elongated shaft 48 will, in turn, drive the driven secondary gear 62 which has the effect of turning stub shaft 50. Spur gear 64 turns with the stub shaft and, by virtue of its meshing relation with the ring gear, the latter is rotated. Since spring 80 is resiliently engaging the balls 70 within their various recesses, the turning movement of the ring gear 66 will be transmitted by the ball to the tubular member 74. Since the tubular member 74 is connected at its upper end with the housing assembly 12, the housing assembly 12 will be rotated from its operative position into its folded position. Circuitry can be provided to deenergize the motor when the housing assembly 12 reaches the folded position. When the electric motor is energize to rotate in the opposite direction, the housing assembly 12 will be rotated back into its operative position.

When the mirror housing 12 is in its operative position and a force is applied to the mirror housing in the rearward direction, the tendency for the housing assembly 12 to turn or rotate about its axis into its folded position is transmitted to the tubular member 74 by virtue of its fixed connection with the housing assembly 12. Since the electric motor 42 is inoperable and the motion transmitting mechanism 44 up to and including the ring gear 66 is held stationary, the tendency for the housing assembly 12 to pivot about its axis will be resisted by the engagement of the balls 70 within the recesses of the flange 72. If the force applied to the housing assembly 12 is sufficient to overcome the bias of the spring 80, the housing assembly 12 will move from its operative position at which time the flange 72 rides up on the ball 70 enabling the entire housing assembly to move to its folded position. If a force is applied in the forward direction on the housing assembly 12, a similar pivotal movement about the upright axis "A" provided by the pivot assembly 18 will take place, enabling the mirror to fold forwardly about its axis.

Figure 4:
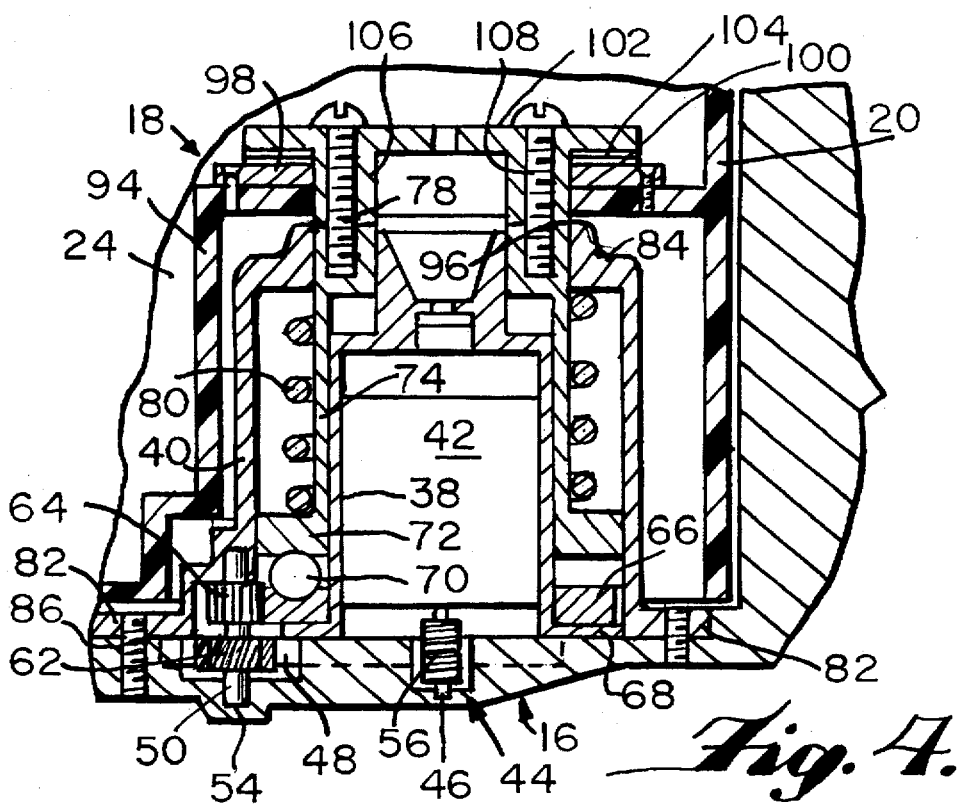
FIG. 4 is a view similar to FIG. 3 showing the position of the parts during the movement of the housing assembly with respect to the support assembly.

Referring now more particularly to FIGS. 3 and 4, there is shown therein certain modifications in the pivot assembly 18. The variations relate specifically to the manner in which the pivot assembly 18 is connected with the housing assembly 12. Instead of the bracket 88, the variations shown in FIGS. 3 and 4 include an interior wall 94 formed integrally as a part of the housing shell structure. The integral wall 94 is formed to receive the pivot assembly 18 upwardly therein so that the upper end 78 of the tubular body 74 is capable of being moved upwardly through an opening 96 in the wall 94. Fixed to the upper surface of the wall is a spring pressed clutch system which includes an annular clutch element 98 having a series of annular ridges 100 formed on the upper surface thereof. Mounted above the clutch element 98 is a second clutch element 102 which includes a series of ridges 104 on the lower outer surface thereof and an annular portion 106 which extends downwardly from the inner end of the ridges 104. The annular portion 100 extends through the first annular clutch member 98 through the opening 96 in the wall 94 and into engagement with the upper end 78 of the tubular body 74. The second clutch element 102 is fixed to the tubular body 74 by suitable fasteners 108. The spring 80 of the pivot assembly 18 will normally bias the two clutch elements 98 and 102 so that their ridges 100 and 104 interengage. It will be understood that other clutching configurations may be utilized such as balls within recesses or even abutting planar friction surfaces. With the embodiment shown, there are essentially two clutch systems both of which are under the control of the single spring 80. It will be understood that the ridges 100 provided by the first clutch member 98 may be formed integrally with the wall 94 and that the connection between the second clutch element 102 and the upper end 78 of the tubular body 74 can be a snap fit connection rather than a fastener connection. This same comment is also true with respect to the securement of the outer tubular member 40 with respect to the fixed support structure 36. Since the entire pivot assembly 18 is assembled by a sequence of downward movements of the components, it will be readily apparent that the assembly is readily susceptible to automation.

As indicated above in the preferred embodiment shown in FIG. 1, the electric motor 42 is fixed to the inner tubular member 38 and is thus carried in a fixed relation with respect to the fixed support structure 36. While this is preferred, it is within the contemplation of the present invention in its broadest aspect to open the upper end of the inner tubular structure 38 and to fix the electric motor 42 to the upper portion 78 of the tubular body 74 so that the motor 42 extends within the inner tubular member 38 but is capable of a relative rotational movement with the tubular body 74 with respect to the inner tubular member 38. With this arrangement, it is still possible to effect a turning movement either in respect to the operation of the motor 42 or in response to a force applied to the housing assembly 12. As long as the electric motor 42 is not energized, the outer tabular member 40 is capable of being turned with respect to the output shaft 46 and, hence, the movement is accommodated even though the output shaft 46 with its connected drive gear 56 is fixed.

Any United States patent applications or patents mentioned or cited hereinabove are hereby incorporated by reference into the present specification.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A vehicle mirror assembly comprising a housing assembly, a mirror unit mounted on said housing assembly, a support assembly constructed and arranged to be fixedly mounted on a vehicle and to support said housing assembly thereon in an operative position extending laterally outwardly from the vehicle so that said mirror unit serves as an exterior rear view mirror for the driver of the vehicle, a power operated pivot assembly within said housing assembly constructed and arranged to enable said housing assembly to be pivoted with respect to said support assembly about a generally upright axis (1) between the operative position thereof and a folded position with respect to the vehicle in response to the power operation of said pivot assembly and (2) from the operative position thereof in either direction in response to an unwanted impact blow applied in either direction thereto, said power operated pivot assembly including a series of components constructed and arranged to be assembled with respect to said support assembly in a sequence of downward movements, said series of components including an outer tubular member which is moved with respect to said support assembly as the last downward movement in said sequence and is fixed thereto to retain the series of components in assembled relation and a tubular body disposed concentrically between said outer tubular member and said electrical motor, said tubular body extending upwardly from an opening in an upper end of said outer tubular member for connection with said housing assembly, said housing assembly being connected with said tubular body by a connection constructed and arranged to enable said housing assembly to be moved by said tubular body in response to the power operation of said pivot assembly, said series of components defining a speed reduction motion transmitting assembly connected between an output shaft of said electric motor and said housing assembly, said speed reduction motion transmitting assembly including a first motion transmitting member connected to move in response to a desired rotational movement of said motor shaft, said tubular body constituting a second motion transmitting member of said speed reduction motion transmitting assembly, connected to move with said housing assembly, and a spring biased indexing system between said first and second motion transmitting members constructed and arranged to (1) transmit the movement of said first motion transmitting member in response to a desired rotation of said motor shaft to said second motion transmitting member to thereby move said housing assembly in response to the desired rotation of said motor shaft and (2) allow said second motion transmitting member to move with said housing assembly relative to said first motion transmitting member in response to an unwanted impact blow applied in either direction to said housing assembly.

2. A vehicle mirror assembly as defined in claim 1 wherein said electrical motor is mounted with the output shaft thereof concentric with said upright axis.

3. A vehicle mirror assembly as defined in claim 2 wherein said second motion transmitting member is fixed to said housing assembly.

4. A vehicle mirror assembly as defined in claim 2 wherein said second motion transmitting member is connected to move with said housing assembly by a spring pressed clutch system.

5. A vehicle mirror assembly as defined in claim 2 wherein said series of components includes an inner tubular member concentric with said upright axis disposed between said tubular body and said electric motor, said inner tubular member having an exterior flange on one end thereof engaged with said support assembly, said electric motor being fixedly mounted within said inner tubular member.

6. A vehicle mirror assembly as defined in claim 5 wherein said first motion transmitting member comprises a ring gear mounted on the exterior flange of said inner tubular member in surrounding relation to said inner tubular member, said tubular body being disposed in surrounding relation to said inner tubular member and having an annular flange extending outwardly from a lower end thereof, said outer tubular member being disposed in spaced surrounding relation with said tubular body and having a lower end fixed to said support assembly and an upper annular flange extending inwardly from an upper end thereof, said indexing system including a coil spring within the space between said outer tubular member and said tubular body acting between the upper annular flange of said outer tubular member and the lower annular flange of said hollow body so as to resiliently urge said lower annular flange downwardly toward said ring gear and a plurality of annularly spaced balls between said lower annular flange and said ring gear disposed to engage within corresponding annularly ball receiving depressions formed in said lower annular flange and said ring gear.

7. A vehicle mirror assembly as defined in claim 6 wherein said tubular body includes an annular bearing portion formed on an upper end thereof providing an exterior bearing surface slidably engaging a mating bearing surface on said upper annular flange and an interior bearing surface slidably engaging a mating bearing surface formed on an upper end of said inner tubular member.

8. A vehicle mirror assembly as defined in claim 7 wherein the components of said first motion transmission assembly further includes a stub shaft mounted between said support assembly and the lower end portion of said outer tubular member for rotation about an axis parallel with said upright axis and an elongated shaft mounted with respect to said support assembly for rotation about an axis disposed within a plane perpendicular to a plane passing through the parallel axes, a first spiral gear fixed to said output shaft in meshing relation with a first cooperating gear fixed to said elongated shaft, a second spiral gear fixed to said elongated shaft in meshing relation with a second cooperating gear on said stub shaft and a drive gear fixed to said stub shaft in meshing relation with said ring gear.

9. A vehicle mirror assembly comprising a housing assembly, a mirror unit mounted on said housing assembly for movement into any one of a multiplicity of adjusted positions with respect thereto, a support assembly constructed and arranged to be fixedly mounted on a vehicle and to support said housing assembly thereon in an operative position extending laterally outwardly from the vehicle in generally surrounding relation to said mirror unit which serves as an exterior rear view mirror for the driver of the vehicle, a power operated pivot assembly within said housing assembly constructed and arranged to enable said housing assembly to be pivoted with respect to said support assembly about a generally upright axis (1) between the operative position thereof and a folded position with respect to the vehicle in response to the power operation of said pivot assembly and (2) from the operative position thereof in either direction in response to an unwanted impact blow applied in either direction thereto, said power operated pivot assembly including an electrical motor constructed and arranged to be operated by electrical power, and a speed reduction motion transmitting assembly connected between an output shaft of said electric motor and said housing assembly, said electric motor being fixedly mounted on said support assembly, said motion transmitting assembly comprising a plurality of components mounted on said support assembly including a first motion transmitting member connected to move in response to a desired rotational movement of said motor shaft, a second motion transmitting member connected to move with said housing assembly, and a spring biased indexing system between said first and second motion transmitting members constructed and arranged to (1) transmit the movement of said first motion transmitting member in response to a desired rotation of said motor shaft to said second motion transmitting member to thereby move said housing assembly in response to the desired rotation of said motor shaft and (2) allow said second motion transmitting member to move with said housing assembly relative to said first motion transmitting member in response to an unwanted impact blow applied in either direction to said housing assembly.

10. A vehicle mirror assembly as defined in claim 9 wherein said electrical motor is mounted with the output shaft thereof concentric with said upright axis.

11. A vehicle mirror assembly as defined in claim 10 wherein said second motion transmitting member is fixed to said housing assembly.

12. A vehicle mirror assembly as defined in claim 10 wherein said second motion transmitting member is connected to move with said housing assembly by a spring pressed clutch system.

13. A vehicle mirror assembly as defined in claim 10 wherein said power operated pivot assembly includes an inner tubular member concentric with said upright axis having an exterior flange on one end thereof engaged with said support assembly, said electric motor being fixedly mounted within said inner tubular member.

14. A vehicle mirror assembly as defined in claim 13 wherein said first motion transmitting member comprises a ring gear mounted on the exterior flange of said inner tubular member in surrounding relation to said inner tubular member, said second motion transmitting member which constitutes said tubular body being disposed in surrounding relation to said inner tubular member and having an annular flange extending outwardly from a lower end thereof, said outer tubular member being disposed in spaced surrounding relation with said tubular body and having a lower end fixed to said support assembly and an upper annular flange extending inwardly from an upper end thereof, said indexing system including a coil spring within the space between said outer tubular member and said tubular body acting between the upper annular flange of said outer tubular member and the lower annular flange of said hollow body so as to resiliently urge said lower annular flange downwardly toward said ring gear and a plurality of annularly spaced balls between said lower annular flange and said ring gear disposed to engage within corresponding annularly ball receiving depressions formed in said lower annular flange and said ring gear.

15. A vehicle mirror assembly as defined in claim 14 wherein said tubular body includes an annular bearing portion formed on an upper end thereof providing an exterior bearing surface slidably engaging a mating bearing surface on said upper annular flange and an interior bearing surface slidably engaging a mating bearing surface formed on an upper end of said inner tubular member.

16. A vehicle mirror assembly as defined in claim 15 wherein the components of said first motion transmission assembly further includes a stub shaft mounted between said support assembly and the lower end portion of said outer tubular member for rotation about an axis parallel with said upright axis and an elongated shaft mounted with respect to said support assembly for rotation about an axis disposed within a plane perpendicular to a plane passing through the parallel axes, a first spiral gear fixed to said output shaft in meshing relation with a first cooperating gear fixed to said elongated shaft, a second spiral gear fixed to said elongated shaft in meshing relation with a second cooperating gear on said stub shaft and a drive gear fixed to said stub shaft in meshing relation with said ring gear.

17. A vehicle mirror assembly comprising a housing assembly, a mirror unit mounted on said housing assembly, a support assembly constructed and arranged to be fixedly mounted on a vehicle and to support said housing assembly thereon in an operative position extending laterally outwardly from the vehicle so that said mirror unit serves as an exterior rear view mirror for the driver of the vehicle, a power operated pivot assembly within said housing assembly constructed and arranged to enable said housing assembly to be pivoted with respect to said support assembly about a generally upright axis (1) between the operative position thereof and a folded position with respect to the vehicle in response to the power operation of said pivot assembly and (2) from the operative position thereof in either direction in response to an unwanted impact blow applied in either direction thereto, said power operated pivot assembly including a series of components constructed and arranged to be assembled with respect to said support assembly in a sequence of downward movements, said series of components including an outer tubular member which is moved with respect to said support assembly as the last downward movement in said sequence and fixed thereto to retain the series of components in assembled relation and a tubular body disposed within said outer tubular member extending upwardly from an opening in an upper end of said outer tubular member for connection with said housing assembly, said housing assembly being connected with said tubular body by a connection constructed and arranged to enable said housing assembly to be moved about said upright axis by said tubular body in response to the power operation of said pivot assembly, wherein said series of components further includes an elongated shaft which is moved downwardly in said sequence into a bearing groove formed in said support assembly, a stub shaft one end of which is moved downwardly in said sequence into a bore formed in said support assembly, an inner tubular member having an electric motor fixed therein, said electric motor having an output shaft having a drive gear thereon, said inner tubular member being moved downwardly in said sequence so that said electric motor shaft is coextensive with said upright axis and the drive gear thereon meshes with a cooperating driven gear on said elongated shaft, said elongated shaft also having a secondary drive gear thereon which meshes with a cooperating driven gear on said stub shaft, said stub shaft also having a spur gear thereon, said series of components also including an exterior ring gear journalled in surrounding relation on said inner tubular member and disposed in meshing relation with said spur gear, said tubular body having exterior annular flange on a lower end thereof, said outer tubular member being disposed in spaced surrounding relation to said tubular body and having an interior annular flange on an upper end thereof rotatably receiving an upper end portion of said tubular body, a coil spring within the space between said outer tubular member and said tubular body acting between said exterior flanges so as to resiliently urge said exterior annular flange downwardly toward said ring gear, and a plurality of annularly spaced balls disposed to engage within corresponding annular spaced ball receiving depressions formed in said exterior annular flange and said ring gear.

18. A vehicle mirror assembly as defined in claim 17 wherein said housing assembly includes a molded plastic shell structure having a rearward periphery within which said mirror unit is disposed and a forwardly bulging front wall, a fixed casing member fixed to said front wall in a rearwardly disposed relation, a cooperating casing member detachably fixed to said fixed casing member and a power operated adjusting assembly carried by and within said fixed and cooperating casing members and extending from the latter to said mirror unit for adjusting said mirror unit into any one of a multiplicity of adjusted positions.

19. A vehicle mirror assembly as defined in claim 18 wherein said connection between said housing assembly and said tubular body includes a bracket fixed to said fixed casing member.

20. A vehicle mirror as defined in claim 18 wherein said housing assembly and said tubular body includes an integral portion of said molded plastic shell structure.

* * * * *